US008631000B2

(12) United States Patent
Franke et al.

(10) Patent No.: US 8,631,000 B2
(45) Date of Patent: Jan. 14, 2014

(54) SCAN SHARING FOR QUERY PREDICATE EVALUATIONS IN COLUMN-BASED IN-MEMORY DATABASE SYSTEMS

(75) Inventors: Hubertus Franke, Cortlandt Manor, NY (US); Hong Min, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 12/894,370

(22) Filed: Sep. 30, 2010

(65) Prior Publication Data

US 2012/0084278 A1 Apr. 5, 2012

(51) Int. Cl.
*G06F 17/30* (2006.01)

(52) U.S. Cl.
USPC .......................................... 707/719; 707/713

(58) Field of Classification Search
USPC .................................................. 707/719, 713
See application file for complete search history.

(56) References Cited

U.S. PATENT DOCUMENTS

| 7,080,074 | B2 | 7/2006 | Hrle | |
|---|---|---|---|---|
| 7,330,848 | B2 | 2/2008 | Chaudhuri | |
| 7,512,747 | B2 | 3/2009 | Bhattacharjee | |
| 7,908,259 | B2 * | 3/2011 | Branscome et al. | 707/705 |
| 2008/0147627 | A1 * | 6/2008 | Natkovich et al. | 707/4 |
| 2008/0243768 | A1 * | 10/2008 | Freedman et al. | 707/2 |
| 2009/0006399 | A1 * | 1/2009 | Raman et al. | 707/7 |
| 2009/0228465 | A1 | 9/2009 | Krishnamurthy | |
| 2009/0254774 | A1 * | 10/2009 | Chamdani et al. | 707/5 |
| 2011/0016157 | A1 * | 1/2011 | Bear et al. | 707/804 |
| 2011/0082855 | A1 * | 4/2011 | Al-Omari et al. | 707/715 |
| 2011/0213766 | A1 * | 9/2011 | Hong et al. | 707/718 |

OTHER PUBLICATIONS

George P Copeland & Setrag N Khoshafian, "A Decomposition Storage Model". 1985 ACM 0-89791-160-1/85/005/0268, p. 268-279.
Song Wang, Elke Rundensteiner, "State-Slice: New Paradigm of Multi-query Optimization of Window-based Stream Queries". VLDB '06, Sep. 12-15, 2006, Seoul, Korea, p. 619-630.
Yanlei Diao, "Path Sharing and Predicate Evaluation for High Performance XML Filtering,"ACM TODS 28(4): 467-516, Dec. 2003. ACM Press, New York, NY.
Richard L Cole & Goetz Graefe, "Optimization of Dynamic Query Evaluation Plans". CU-CS-671-93, Dec. 1993, Univ. of Colorado at Boulder.
Vldislav Shkapenyuk, Ryan Williams, Stavros Harizopoulos & Anastassia Allamaki, "Deadlock Resolution in Pipelined Query Graphs". Mar. 2005, CMU-CS-05-122.
Kun Gao et al., "Simulaneous Pipelining in QPipe: Exploiting Work Sharing Opportunities Across Queries," Proceedings of the 22nd ICDE, Atlanta, GA, Apr. 2006.

(Continued)

*Primary Examiner* — Wilson Lee
*Assistant Examiner* — Thuy Tiffany Bui
(74) *Attorney, Agent, or Firm* — Preston J. Young; Otterstedt, Ellenbogen & Kammer, LLP

(57) ABSTRACT

A plurality of queries of an in-memory column-oriented database are obtained. Each of the queries has at least one column predicate. For each of the queries, it is determined which of a plurality of columns in the in-memory column-oriented database need to be scanned. The plurality of queries are grouped into a plurality of scan groups, based at least in part on the determining step. The column predicates are evaluated for those of the queries in a given one of the scan groups in accordance with a scheduling scheme. The grouping step and the scheduling scheme take into account real time scan information.

25 Claims, 7 Drawing Sheets

(56) References Cited

OTHER PUBLICATIONS

Marcin Zukowski, Sandor Heman, Niels Nes, Peter Boncz, "Cooperatilve Scans: Dynamic Bandwidth Sharing in a DBMS". VLDB '07, Sep. 23-28, 2007, Vienna, Austria.

Mike Stonebraker, Daniel J. Abadi, Adam Batkin, Xuedong Chen, "C-Store: A Column—oriented DBMS," VLDB 2005 553-564.
Lin Qiao, et al., "Main-Memory Scan Sharing for Multi-core CPUs," Proc. 34th Intl. Conf. on Very Large Data Bases, 2008, 610-621.
Anon., Branch Misprediction, Wikipedia, downloaded from http://en.wikipedia.org/wiki/Branch_misprediction Sep. 30, 2010.

* cited by examiner

SCAN SHARING FOR QUERY PREDICATE EVALUATIONS IN COLUMN-BASED IN-MEMORY DATABASE SYSTEMS

FIELD OF THE INVENTION

The present invention relates to the electrical, electronic and computer arts, and, more particularly, to database management systems (DBMS) and the like.

BACKGROUND OF THE INVENTION

Most traditional DBMS use a record-oriented (row-based) storage layout which stores all attribute columns of a single record in contiguous storage. This layout is appropriate for efficiency with respect to Online Transaction Processing (OLTP) database workloads.

Column store does not store an entire record in physically contiguous storage. It packs one (or more) attribute column(s) from many records together in contiguous storage. The attributes of a record are logically stitched together, based on their values extracted from different columns, using a common identification token or similar logical concept (such as the same offset from different column arrays). In a data warehouse environment, column store has the advantage of only accessing necessary attribute columns for query processing to reduce input/output (I/O) and memory bandwidth.

SUMMARY OF THE INVENTION

Principles of the invention provide techniques for scan sharing for query predicate evaluations in column-based in-memory database systems. In one aspect, an exemplary method includes the steps of obtaining a plurality of queries of an in-memory column-oriented database, each of the queries having at least one column predicate; determining, for each of the queries, which of a plurality of columns in the in-memory column-oriented database need to be scanned; grouping the plurality of queries into a plurality of scan groups, based at least in part on the determining step; and evaluating the column predicates for those of the queries in a given one of the scan groups in accordance with a scheduling scheme. The grouping step and the scheduling scheme take into account real time scan information.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

Techniques of the present invention can provide substantial beneficial technical effects. For example, one or more embodiments may provide one or more of the following advantages:

reduce required memory bandwidth to fulfill the query and predicate evaluation reduce latency and response times of query and predicate evaluation increased performance through higher query and predicate evaluation throughput lower cost of ownership at particular performance goals These and other features and advantages of the present invention will become apparent from the following detailed description of illustrative embodiments thereof, which is to be read in connection with the accompanying drawings.

DETAILED DESCRIPTION OF PREFERRED EMBODIMENTS

As noted, most traditional DBMS use a record-oriented (row-based) storage layout which stores all attribute columns of a single record in contiguous storage. This layout is appropriate for efficiency with respect to Online Transaction Processing (OLTP) database workloads.

As also noted, column store does not store an entire record in physically contiguous storage. It packs one (or more) attribute column(s) from many records together in contiguous storage. The attributes of a record are logically stitched together, based on their values extracted from different columns, using a common identification token or similar logical concept (such as the same offset from different column arrays). In a data warehouse environment, column store has the advantage of only accessing necessary attribute columns for query processing to reduce input/output (I/O) and memory bandwidth (which is a significant performance issue in certain current system architectures).

Figure 1:
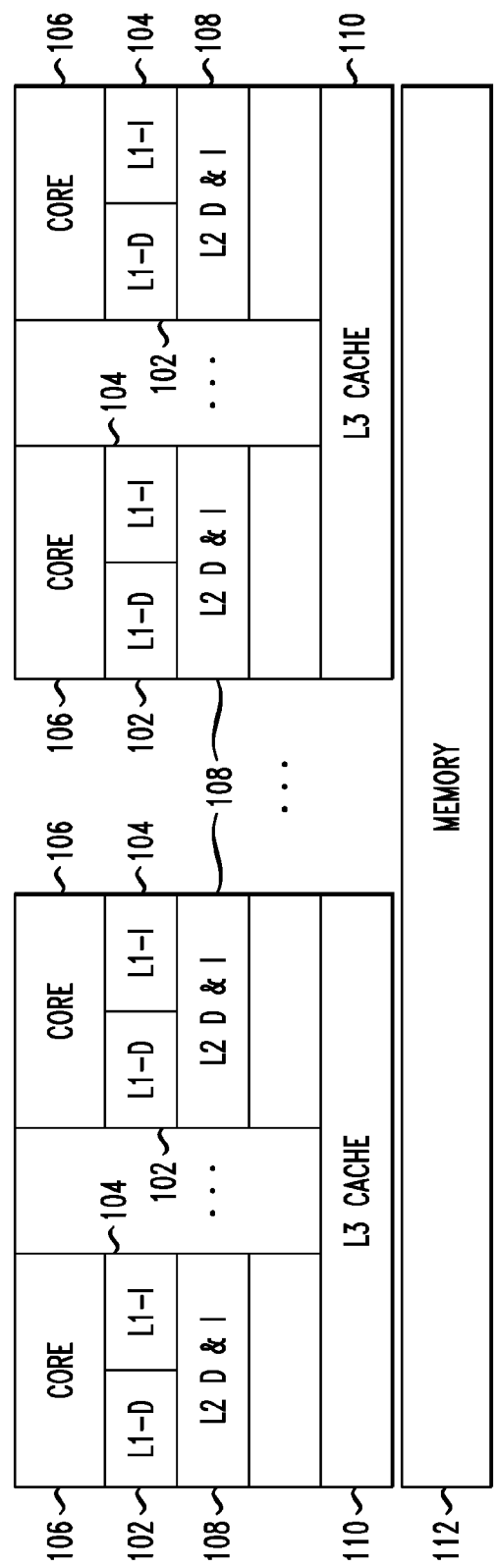
FIG. 1 shows memory and cache hierarchy of a modern multi-core system, which represents a non-limiting example of a system wherein one or more embodiments can be implemented.

As the memory capacity increases and cost decreases, in-memory database systems become increasingly affordable and realistic in terms of system cost. This is especially true for column store, since columns are very often stored in compact encoded format. FIG. 1 depicts a typical hierarchy of memory and cache of a modern multi-core system. Note L1 caches for data 102 and instructions 104; cores 106; L2 data and instruction caches 108; L3 caches 110; and memory 112. The access latency for instructions (labeled 'I' in FIG. 1) and data (labeled 'D' in FIG. 1) increases from L1 cache to L2 cache to L3 cache to memory.

Figure 2:
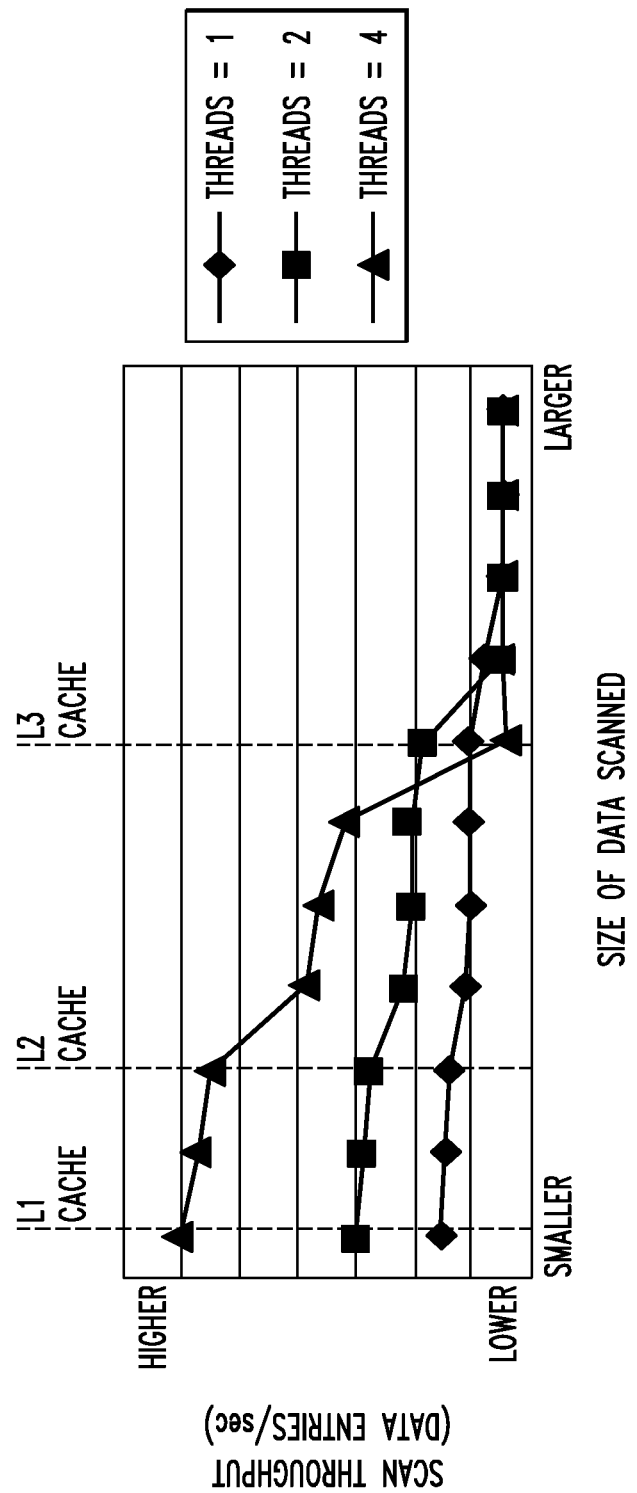
FIG. 2 depicts exemplary performance versus data size and storage hierarchy.

During query processing in column stores, one significant operation is the evaluation of column predicates based on scanning column data. For scans, a significant portion of central processing unit (CPU) cycles are consumed in loading data from memory into cache and a majority of cycles are due to cache miss latency. This cost, in relation to query performance, varies depending on queries and can be as high 80-90% of the predicate scan cost. In addition, the response time of such predicate evaluation can be bounded by the memory bandwidth, especially when a query is processed in parallel by multiple CPU cores using data level parallelism. FIG. 2 illustrates an example of performance being limited by the latency between different layers in storage hierarchy. Additionally, when each CPU or CPU core is frequently context-switched to handle different queries on different subsets of data, cache thrashing may result. In particular, performance (scan throughput in data entries per second on y axis) is plotted versus data size (x axis) and storage hierarchy. Note diamond-shaped data points on curve for a single thread; square-shaped data points on curve for two threads; and triangle-shaped data points on curve for four threads.

To achieve better scalability, higher throughput, and reduced average query response time in a mixed on-going query workload, one approach is to divide queries into different groups so that the scan of data columns can be scheduled and shared among different queries, in order to increase cache reuse. Cache reuse in simple first-in-first-out (FIFO) processing of queries with associated scan operations is currently non-existent for large in-memory databases. When structuring and scheduling concurrent query processing with cache reuse in mind, only one query loads a portion of data (columns) into cache. Other queries can share the data for their predicate evaluations without incurring the data load cost and cache miss penalty. However, in at least some cases, performing scan sharing by grouping only based on first column(s) is not sufficient. The impact of grouping and scan sharing on overall workload, such as response time, throughput, and potential cache thrashing, is preferably taken into consideration. A scheduling mechanism with dynamic adjustment based on real time sharing information is also appropriate in one or more instances.

One or more embodiments provide a scan sharing method for in-memory column-oriented databases, which allows sharing the scan operations during predicate evaluation among similar queries in the workload. In a non-limiting exemplary embodiment, the method includes query optimization and grouping, wherein the optimization method and/or process determines the scan columns of arriving queries based on query characteristics, access paths, estimated costs and working set sizes, and on-going scan information in the system; followed by an aggregation technique that groups queries based on their scanned columns, adjusted by real time scan information in the system. The optimization and grouping method are preferably used together (may be done iteratively for more than once) to make scan and grouping decision (s). Furthermore, with regard to scheduling, in one or more instances a scheduling method and/or process schedules shared scans for groups of queries and dynamically adjusts sharing parameters and policies such as the size of data to be scanned for each shared group based on its working set size, the number of queries in a shared group, and the like, based on real time scan information and/or statistics collected. Real time scan information is collected to feed back into these two steps. Hence a closed-loop optimization and/or grouping and scheduling mechanism is formed for continuous query workload(s).

A typical predicate evaluation in a query is expressed as a combination of simple comparative or membership expression(s) on a single column. A simple example is:

product_ID='12345' AND sales_quantity >10 AND
city in ('NEW YORK', 'BOSTON')

Such example asks for qualified records that satisfy the conditions expressed. Column attributes "product_ID," "sales_quantity," and "city" are the three columns out of the table used in this particular query's predicate. The term "city in ('NEW YORK', 'BOSTON')" is a membership condition for any record that has the "city" column attribute of "NEW YORK" or "BOSTON." In general, the combination of logical conditions among the predicate columns can be conjunctive, disjunctive, or nested, which sometimes can be more complex than the example shown. A common column store layout is to store each column in the same entry order. This means that when each column is expressed as an array of its own data type (encoded or not encoded), the entries from the same offset of all arrays logically form a record in the table. Scanning one or more columns is an efficient way to start the evaluation of the predicates. In the example above, one approach is to scan the "product_ID" column, and if a match for "product_ID='12345'" is found, branch to the same array offset of the sales_quantity column to evaluate 'sales_quantity >10,' and then further check the 'city' column. An alternate approach is to scan both the "product_ID" column and the 'sales_quantity' column, apply a bit-wise logical operation between product_ID='12345' AND sales_quantity >10 for each row, and, once a match is found, branch to the same array offset of the 'city' column. Different approaches come with different costs in terms of CPU cost and response time.

Figure 3:
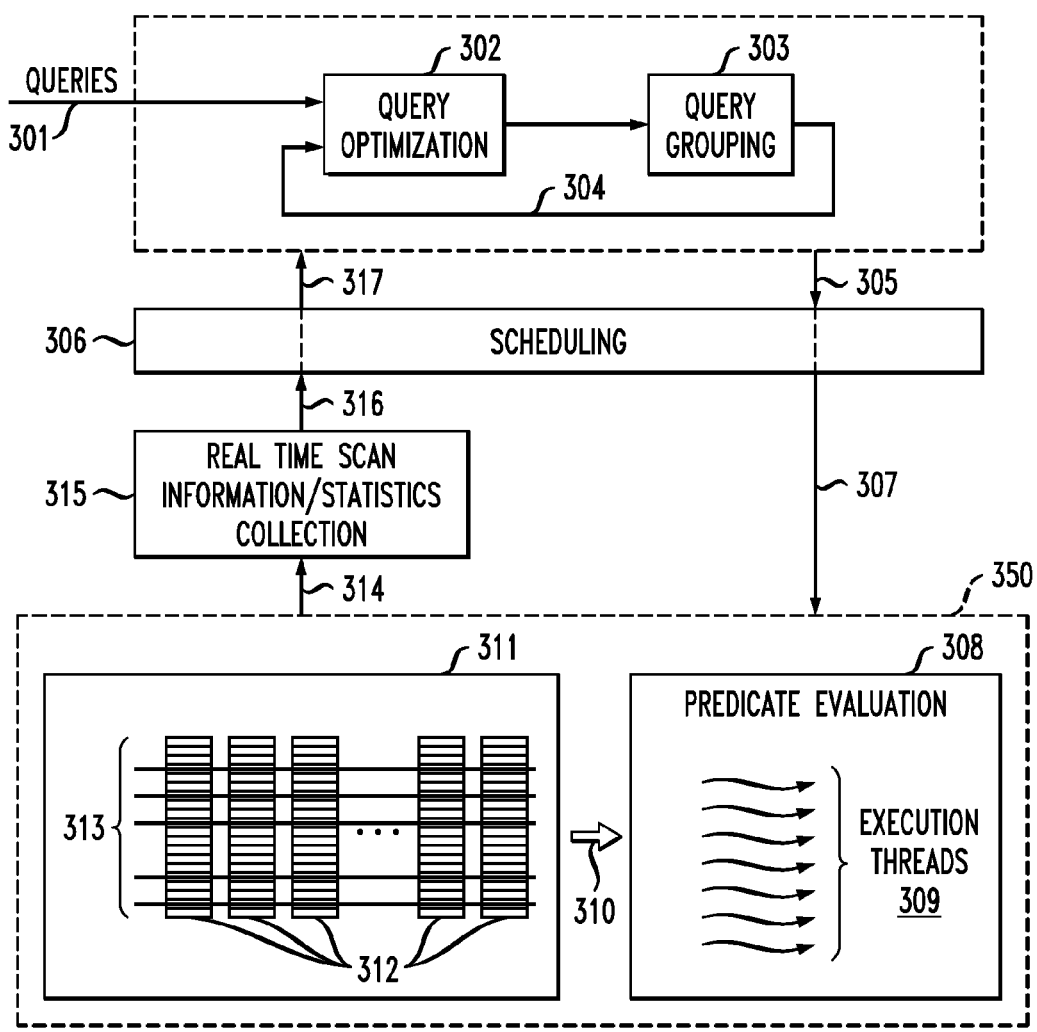
FIG. 3 is combined block diagram and flow diagram, according to an aspect of the invention.

FIG. 3 illustrates a closed-loop scan sharing optimization and/or grouping and scheduling mechanism. Table data 311 includes several columns 312, where each is stored in contiguous storage. Horizontal partitioning 313 is used for data level parallelism.

When queries 301 arrive at the system (typically in an unpredictable arrival pattern), query optimization component 302, along with other optimization functions described in more detail below, decides which column(s) will need to be scanned for each query. Query grouping component 303 uses information from ongoing scan groups (a scan group is a group of queries that share the column scan) to decide whether a new query should be added to one of the groups, or processed by itself (which is equivalent to forming a new group). Alternatively, the information regarding relevant groups can be used in a query optimization step, as shown at 304, to adjust the cost estimated earlier. As shown at 305, the grouping decision, as well as the estimated result size, is forwarded to the scheduling component 306. Scheduling component 306 adds the new queries to the queue of work (scan groups) to be dispatched, and makes necessary scan setting (or parameter) adjustments if necessary. As shown at 307, the dispatched work is sent to query engine 350 for predicate evaluation 308 when multiple threads 309 process the queries concurrently at either one sharing group at a time, or applying time sharing among sharing groups, according to the scheduling scheme, on data 310. The real time sharing information, including statistics, is collected, as shown at 314 and 315, and used by scheduling component 306, as shown at 316, for scheduling parameter adjustment, as well as by the query optimization and grouping blocks 302, 303, as shown at 317, for determining the grouping for upcoming queries.

Along with other optimization functions, query optimization component 302 decides the columns that need to be scanned based on the estimated query cost. Examples of the other optimization functions are a rewrite of the predicate expression. For instance, a Boolean expression can be reordered without compromising the outcome. Yet, given common notation of short Boolean evaluation, the evaluation of the complex predicate expression can be completed when the result is determined. For instance, a predicate expression "$Column_{13}$ 1='A' AND Column_2='B'" is equivalent to "Column_2='A' AND Column_1='A.' However, if "Column_1='A'" qualifies more records than "Column_2='B'" then it is more efficient to reorder to the latter predicate expression and therefore reduce the required loading of the second expression's column into memory. The estimated cost considers factors such as the number of instructions of loading data column(s), evaluating an individual column's predicate, logical operations among individual column expressions, writing qualified data to memory, and the like, all based on database statistics. The number of instructions in a software implementation of predicate evaluation depends on the type of the predicate to be evaluated. For instance, a simple value comparison predicate can be achieved by loading the value at the current column offset, comparing it with the fixed value of the predicate, and conditionally jumping based on the comparison outcome. In another predicate a set inclusion (inlist) might require a lookup of the value within a table which requires more instructions in a software implementation and can also induce cache effects. Important system characteristics such as data load cache miss cost and/or the branch mis-prediction cost are also used for the cost estimation, in one or more embodiments. For a simple predicate example such as "Column_1='A' AND Column_2 in ('1','3','5','7')," after determining that Column_1 qualifies less records and should be evaluated first, there are still two scan options. One is to only scan Column_1 in each record, and once a record qualifies as Column_1='A,' probe Column_2 to evaluate "Column_2 in ('1','3','5','7')." The second option is to scan both columns, and perform a logical bit-wise AND between (Column_1='A') and ("Column_2 in ('1','3','5','7')"). The cost difference between these two options is that the first option might incur more branch mis-predictions and the associated penalties. The second option incurs higher memory load pressure and memory load latencies.

When there already exists a sharing group in the system that scans Column_1 only, or both Column_1 and Column_2, such that this query can take advantage and share the load operation, the cost estimation of either of the above options will vary. The optimization decision on how this predicate will be scanned and evaluated might change. Optimization block 302 can obtain the on-going scan sharing information from query grouping component 303.

Query grouping component 303 assigns queries to different scan groups so that the scan cost and data load latency among queries within a group can be shared. In another aspect, it may decide that a new query does not belong to any active group and should be assigned to a new group or be held till some current queries in active groups finish.

Column store data is divided into partitions, each including a number of consecutive records. Each partition is a unit of work for scheduling. A partition is further divided into smaller units for scan sharing. The factors that determine the data unit size for a shared scan preferably include the scanned data size, and the data that needs to be read from other columns (not scanned) for predicate evaluations by queries; the aggregated size of query results for the block of records evaluated; and any other operations that would take memory and/or cache space. The aggregated size of the above is defined as the "working set size" for a scan sharing group. The group's working set size should preferably not be larger than the L2 cache size of a CPU core, or more generally the size of a cache level at which access latencies can be tolerated. As explained later, the size of a sharing unit is dynamically adjusted in one or more embodiments. Partition size is fixed for scheduling benefit.

When a query is added to a scan sharing group, the data load of the scanned columns for the new query can be avoided. On the other hand, each existing query in the group experiences some delay in its processing since some system resources are consumed by the new query, even though the overall system throughput improves and the average end to end response times of all queries also improves because of less wait time in steady state workload processing. However, in at least some instances, there is a need to set a threshold of number of active queries in a sharing group to avoid stalling queries in the sharing group for too long due to large group size, especially when queries arrive at a high rate. The aggregated cost of unfinished queries in the workload is estimated by this component using real time scan information and/or statistics, and the estimation is used to help make grouping decision(s).

Adding a new query to a scan sharing group also increases the total working set size of a group, which could potentially lead to thrashing. If necessary, the scan sharing size (number of rows per scan) can be reduced at this stage and made aware by the scheduling component 306.

In addition, when there can be more than one option for a sharing scan (for example, a group's scan column(s) is a subset of another group's, or a query has the option of scanning either of two individual columns or both columns), the optimization component can send both options to the grouping component 303 to decide. Alternatively, optimization component 302 can poll the group sharing information from the grouping component 303 during the optimization process.

Another aspect in grouping is that it is common that certain applications state a quality of service (QoS) goal. Specifically, here the QoS goal translates into response time for a certain set of queries. To meet the QoS goals, the specified queries can be grouped separately for scan sharing from other queries and can be assigned a higher priority for scheduling.

The scheduling component schedules groups of queries for processing. A query is added to its group's on-going scan at a partition (defined above) boundary, i.e., at the start of scanning a new partition. Iteratively within the partition, data from each scan sharing unit is loaded by the first query in the group and each active query's predicate is evaluated against the data. No query is added to a group while a partition is in progress. Since partition size is fixed, a query predicate evaluation is finished at partition boundary and removed from a sharing group at boundary points.

Different scheduling techniques can be used for scheduling groups, such as (a) sequentially processing each group, i.e., finish queries in one group before the next group is started, optionally allowing back fill of certain queries for the group during scan; (b) time sharing among each scan sharing group in a round robin fashion at partition boundary; or (c) any other prior scheduling techniques that are modified to use scan sharing within a group's processing and use partition as a unit of group scheduling.

If there is a QoS goal specified for a subset of queries, they are scheduled with preferences.

The scheduling component 306 also adjusts scan sharing size based on real time scan information collected. This is because of the fact that data skew might exist in the table, which could result to the increase of a group's working size to beyond L2 size and cause cache thrashing. When the scheduling component detects this, it can reduce the scan sharing size and inform the grouping component. For the same reason, the scheduling component may defer adding a new query to a sharing group until some of the queries in the sharing group are finished and the group's working size is reduced.

The real time scan information that is collected for feeding back to scheduling component 306 and grouping component 303 includes active scan sharing groups, the progress of each group, the working size of each group (adjusted from estimated to real result size of queries in the group), and so on. The information is collected and fed back at the partition boundary when some queries are finished.

Figure 7:
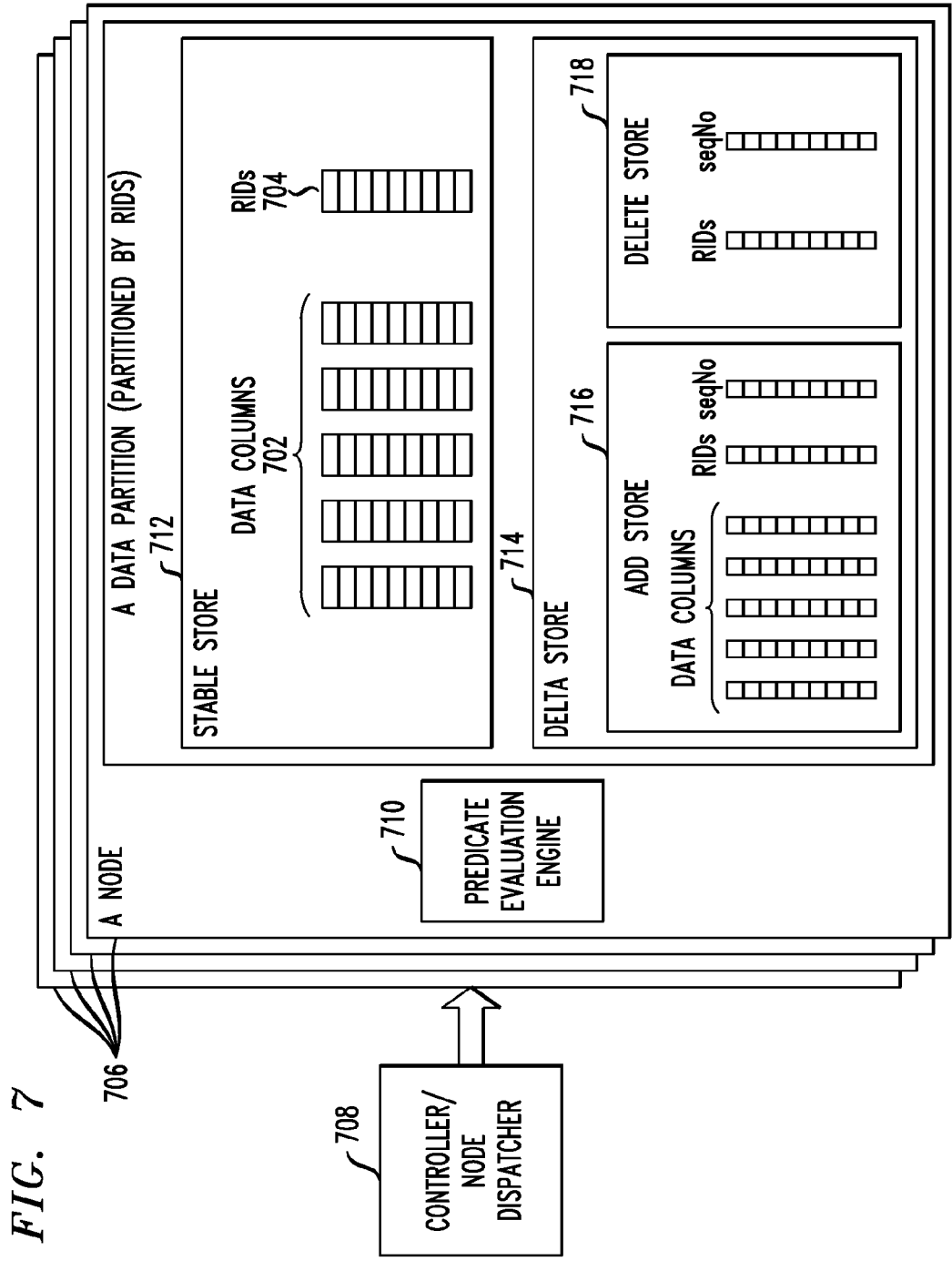
FIG. 7 shows an exemplary system architecture, according to an aspect of the invention.

Reference should now be had to FIG. 7, which depicts a non-limiting exemplary system architecture. One or more embodiments employ a column oriented layout as an index to an underlying table, as well as an in-memory column-oriented predicate evaluation engine. In at least some instances, an objective of predicate search is to find the column entries that match the predicate criteria, and return the matching "record IDs" (RIDs) of the corresponding table entries. One or more embodiments maintain the underlying table in row-oriented layout for the efficiency of data insertion and update in operational environments.

The exemplary execution engine is targeted towards multi-node and multi-core architectures as shown in FIG. 7. By maintaining the same entry order across multiple columns 702, such as following the RID order, it is only required (in this example) to maintain one RID column 704. The data can be partitioned horizontally and the partitions can be stored on a cluster of nodes 706 for parallel evaluations. Within each node, a finer partitioning scheme is used for achieving data parallelism among the processing cores. As shown in FIG. 7, the execution environment includes a front controller ("Node Dispatcher") 708 which sends the predicate evaluation requests to the different nodes. Each node has a Predicate Evaluation Engine 710 that handles the request described elsewhere herein. The column store partition on each node consists of attribute columns and a RID column. Initial data is maintained in the STABLE store 712. Updates are handled in the DELTA store 714 that corresponds to the same partition. The DELTA store includes an ADD store 716 for storing newly inserted data and RIDs, and a DELETE 718 for maintaining the RIDs that have been deleted. An update operation is executed as an atomic 'delete'+'add.' A sequence number column is used to coordinate the time of events for semantic correctness. Data in STABLE and DELTA stores are not merged until the next re-sync phase, which is executed at larger time granules to ensure query performance. However, in at least some embodiments, both are used for predicate evaluations followed with appropriate algebra operations to ensure real time query semantics. The search characteristics, in one or more embodiments, are the same for both stores, and dominate the performance of predicate evaluation.

The predicate evaluation engine 710, in addition to carrying out the evaluation on the column entries against predicates, also includes a just-in-time (JIT) compilation component and a scheduler component. Due to the dynamic nature of the queries presented to the system, in at least some cases, it is not feasible to deploy precompiled code or operators for the predicate evaluation, unless an interpreter operates on low level operators, which is what most database systems use today. To improve predicate evaluation performance, one or more embodiments deploy a query JIT approach (QJIT), where the predicate evaluation expression (e.g. ((col_2<=30) AND (col_1 in [10,20,30]))) is used to dynamically generate binary code. QJIT generates code to scan certain columns following the logic of Short Boolean expression evaluation and based on the predictions that are set by the query optimizer for the expression. It is expected that a predicate evaluation request is optimized in terms of the operation order in the expression when it arrives. The generated code performs as efficient as code preconstructed for a priori known queries. The scheduler dispatches the threads on the nodes to evaluate queries in a work queue on different data partitions.

By way of review and provision of further detail, scan sharing is a method to concurrently execute multiple queries (scans) such that they can access common resources at the same time and hence reduce resource contention in the system. In one or more embodiments, queries that have scan requests on the same columns are grouped together. Scan sharing is implemented at the sub-partition level when predicate evaluation is executed for each shared query in a group on each sub-partition. Once a sub-partition is finished, all queries in the group move to the next sub-partition. In a non-limiting example, limit the sub-partition size to 16K entries to fit the potentially accessed data into an L2 cache of 256K (2 bytes per column entry, potentially multiple columns are accessed and RIDs (record identifiers or record IDs) need to be returned). In a non-limiting experiment, larger numbers of entries (up to 128K entries) were used and no performance improvements were observed, whereas for smaller numbers, performance degradation due to the scheduler was observed. Other results might be obtained in different embodiments and sub-partitions other than 16K could be used in other instances.

In some cases, the scan sharing of queries in each group iterates within a data partition. A unit of work for scheduling is a partition for a group. In a non-limiting example, the partition size was chosen as 16M entries to avoid overhead of the scheduler, and queries only join the sharing of scans at partition boundaries. When a new query arrives, a suitable sharing group is identified based on the columns identified in the expression. For illustrative purposes, consider common first columns as a suitable indicator for scan sharing. The query is added to this group and will participate in the scan at the next partition. Hence a query joining a scan does not typically do so at the beginning of the data column. The scan loops back to the beginning of the column as long as there are unfinished queries in the group.

Figure 4:
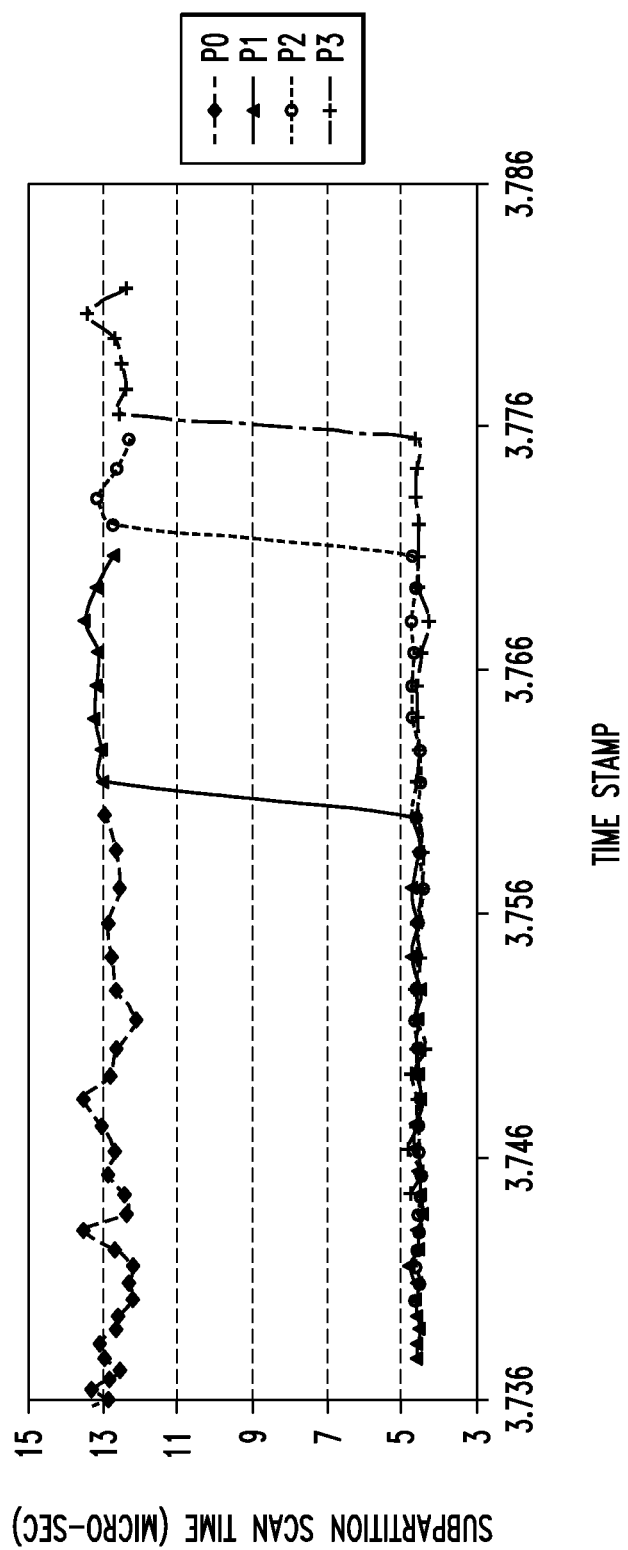
FIG. 4 shows sub-partition response times for multiple queries in scan sharing, according to an aspect of the invention.

FIG. 4 illustrates the performance effect of scan sharing on a group of four identical queries. Each data point reflects the average time spent processing every four sub-partitions for each query. Subsequent queries are injected with short random delay. Until query P0 completes, as the leading query of the group, it pays the cost of bringing the data of the scanned sub-partitions into the cache. The other queries (P1, P2, P3) that joined the group while P0 was executing all can share the data without incurring the cost of bringing the data from memory. In fact their sub-partition execution time is 35% of P0. When P0 finishes, P1 becomes the leading query and incurs the overhead while the remaining threads enjoy the benefits of scan sharing. Overall at full overlap of execution of 4 shared scans, the increased throughput is a factor of 1.9 times faster. Again, different experimental results might be noted in different embodiments. By way of a non-limiting exemplary demonstration of the efficacy of scan sharing, consider the following scheduling policies: first-in-first-out (FIFO), time sharing (TS) and scan sharing (SS). In FIFO, all queries are processed in order of arrival and the multiple threads concurrently operate on different partitions of the data until the query is completed. In time sharing, up to 32 active queries are served in a round robin fashion by hardware threads and the unit of work is one partition of a query at a time. For scan sharing, queries are assigned to sharing groups based on their similarities. Service groups in round robin fashion dedicating all threads to one active group until all active queries in the group are finished. Allow backfill ('BF') from the waiting queries up to a distance of BF queries to join the same active group. Newly arriving queries can join their active group's scan as long as their distance to the first active query in the group is no greater than BF.

Figure 5:
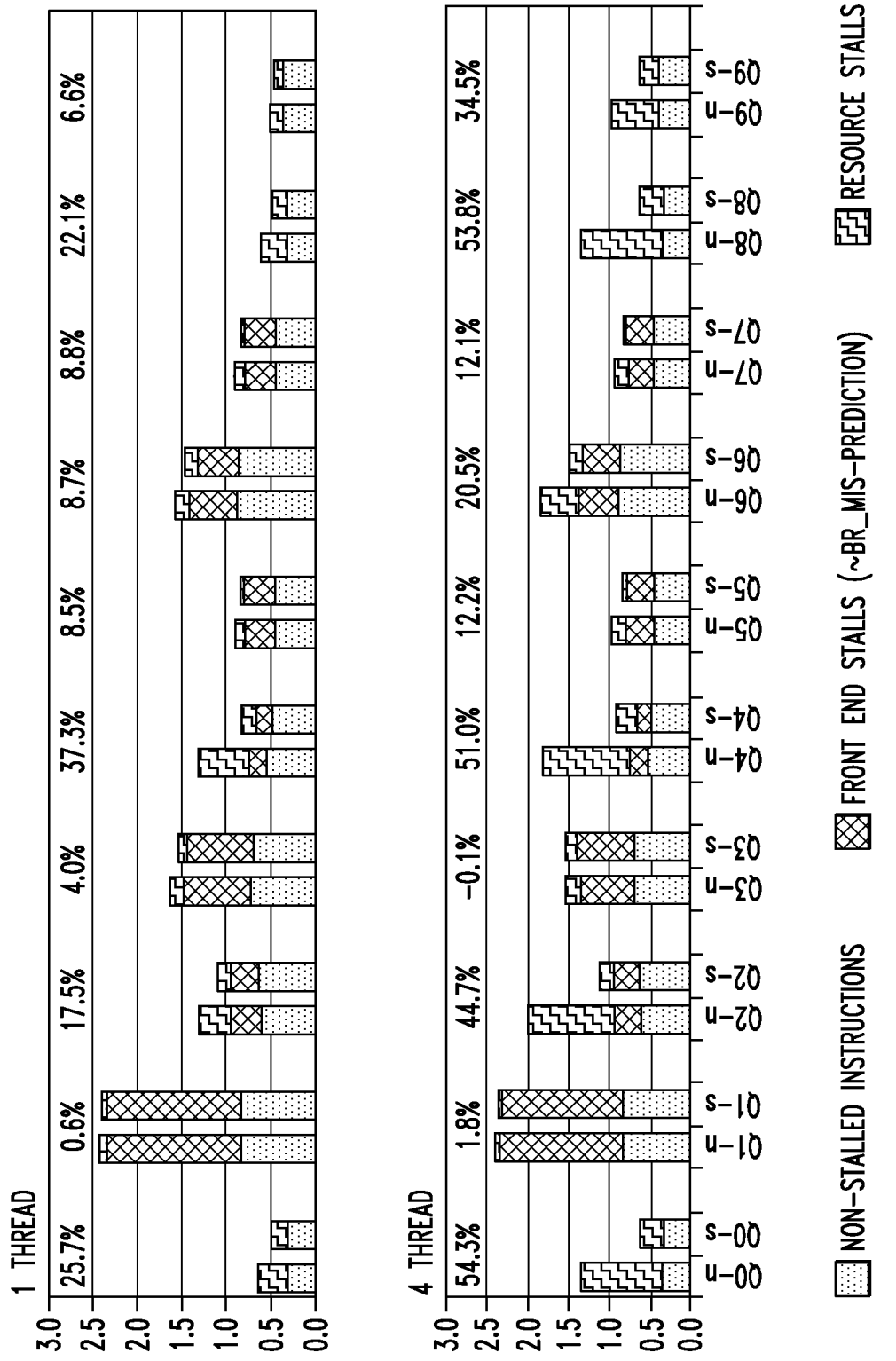
FIG. 5 depicts exemplary CPI reduction by deploying scan sharing at level 16 for one and four threads, according to an aspect of the invention.

In a non-limiting experiment, the same query was rapidly submitted and the cycles per instructions (CPI), front-end and resource stalls were measured for running each query in FIFO (same as scan sharing with BF=0) on a single thread and on four threads and compared with those observed for scan sharing with BF=16. Cycles per instruction (CPI) is a general measurement for the efficiency of the execution of software. The lower the CPI, the more efficient the execution. Higher CPIs are often the result of the front-end (e.g. branch misprediction and pipeline stalls) and resource stalls (e.g. memory load stalls). A high submission rate guarantees that a sharing level of 16 queries is achieved. Query Q9 needed to run with BF=4 due to lack of memory to store the 100% filtering rate. The results are shown in FIG. 5. Front end stalls relate to instruction starvation due to branch misprediction and resource stalls include contribution from memory operation stalls. For all queries that had substantial resource stalls (Q0, Q4, Q8, Q9), SS was effective in reducing this CPI component. Branch misprediction remains high for queries that have filtering rates that are neither low nor high. It has been noted that branch misprediction can be partially reduced by choosing different sets of vector registers. The impact of resource stalls increases as the number of threads increases due to increased pressure on the memory subsystem. The overall impact on the CPI is shown to range from a 0.6% to a 37.3% reduction for a single thread and from a −0.1% to a 53.8% reduction for four threads. Other results could be obtained in other cases; the results are intended to demonstrate what can be achieved in an exemplary embodiment and are non-limiting.

One or more embodiments sample scan execution statistics and carry out performance scheduling for multiple query scan sharing. Furthermore, one or more embodiments orchestrate data fetching into levels of storage hierarchy and attach queries to the scan operation of the data. One or more embodiments can be employed in connection with a non-stream database system that finishes a query once target data is exhaustively searched.

One or more instances enable scheduling scan sharing of multiple objects and among multiple queries in a column-based dataset. In one or more instances, there is no need to exploit any document structure path. One or more embodiments provide techniques to schedule scan sharing on multiple data objects needed by queries in a feedback loop to achieve better throughput and performance and/or address performance of scan operations in a multi-query workload environment.

Given the discussion thus far, it will be appreciated that, in general terms, an exemplary method, according to an aspect of the invention, includes the step 301 of obtaining a plurality of queries of an in-memory column-oriented database 311. Each of the queries has a plurality of column predicates. An additional step 302 includes determining, for each of the queries, which of a plurality of columns 312 in the in-memory column-oriented database need to be scanned. A further step 303 includes grouping the plurality of queries into a plurality of scan groups, based at least in part on the determining step. A still further step 308 includes evaluating the column predicates for those of the queries in a given one of the scan groups in accordance with a scheduling scheme (for example, a scheduling scheme as determined at 306). The grouping step 303 and the scheduling scheme 306 take into account real time scan information.

In some instances, grouping step 303 includes determining whether a given one of the queries should be assigned to an existing scan group or a new scan group. Such a decision can be made, for example, based on an estimated query cost and the real time scan information. In some instances, for a given one of the queries, rank the columns that need to be scanned based upon the number of records in the in-memory column-oriented database that will be qualified by each column, to obtain at least a first ranked column and a second ranked column, and determine whether the first ranked column should be scanned first or whether the first and second ranked columns should be scanned simultaneously. In some instances, when making such a determination, take into account whether there exists an existing scan group which scans the first ranked column and/or an existing scan group which scans the first and second ranked columns simultaneously.

As discussed just above, one way of ranking columns is based upon the number of records in the in-memory column-oriented database that will be qualified by each column. There are also cases that can be ranked differently; for example, if there is an on-going scan that the new query can join and share on a scan column that are not necessarily the least qualified, but the overall estimated cost is lower due to sharing; or if the least qualified column has a predicate type that is more costly to operate on first in terms of overall query cost.

In another aspect, when determining whether the given one of the queries should be assigned to an existing scan group or a new scan group, determine whether adding the given one of the queries to the existing scan group would cause the size of the, existing scan group to exceed the size of a cache level at which access latencies can be tolerated; if adding the given one of the queries to the existing scan group would cause its size to exceed the size of the cache level at which the access latencies can be tolerated, assign the given one of the queries to a new scan group.

In some cases, when determining whether the given one of the queries should be assigned to an existing scan group or a new scan group, determine whether adding the given one of the queries to the existing scan group would cause the size of the existing scan group to exceed a threshold based upon avoidance of stalling; if adding the given one of the queries to the existing scan group would cause its size to exceed the threshold based upon avoidance of stalling, assign the given one of the queries to the new scan group.

In one or more embodiments, grouping 303 takes into account quality of service requirements.

In some instances, the in-memory column-oriented database is horizontally partitioned into a plurality of partitions 313, and in the grouping of the queries, a given one of the plurality of queries is added to an ongoing scan of a corresponding one of the plurality of scan groups at commencement of scanning a new one of the partitions.

Non-limiting examples of real time scan information include one or more of an identification of active scan groups; progress of active scan groups; and working size of active scan groups. Where the aforementioned partitions 313 exist, the real time scan information is preferably obtained at commencement of scanning a new one of the partitions.

Note that block 302 is equally indicative of a query optimization step and a module that performs same; block 303 is equally indicative of a query grouping step and a module that performs same; block 306 is equally indicative of a scheduling step and a module that performs same; and predicate evaluation 308 is equally indicative of a predicate evaluation step and at least a portion of a block, such as a query engine, to perform same.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
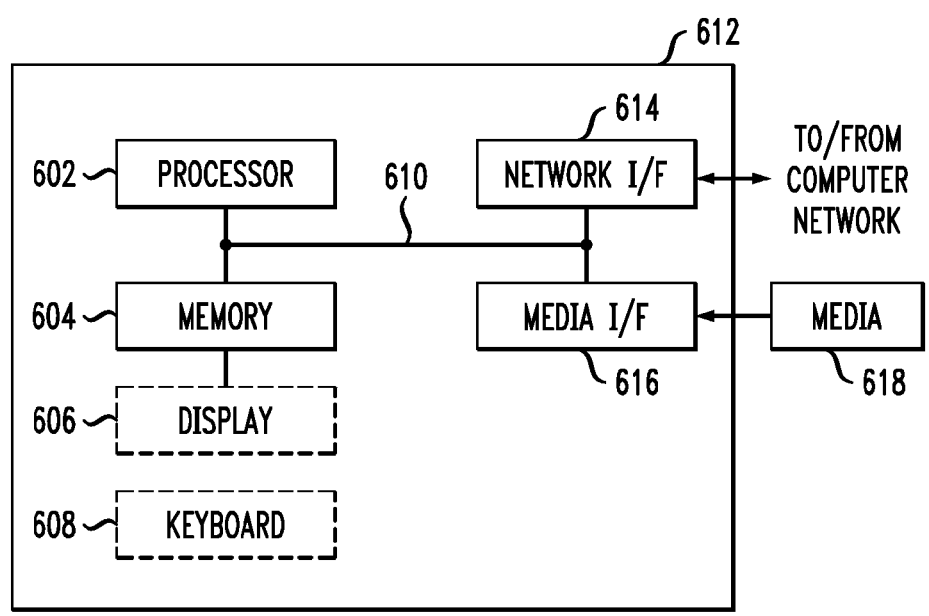
FIG. 6 depicts a computer system that may be useful in implementing one or more aspects and/or elements of the invention.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, FORTRAN, PASCAL, ADA, PL/x or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a query optimization module 302, a query grouping module 303, a scheduling module 306, and a query engine module (for example, carrying out predicate evaluation 308 with one or more execution threads 309). The method steps can then be carried out using the distinct software modules and/or sub-modules of the system, as described above, executing on one or more hardware processors 602. Further, a computer program product can include a computer-readable storage medium with code adapted to be implemented to carry out one or more method steps described herein, including the provision of the system with the distinct software modules. Note that a simple system is depicted in FIG. 6 for illustrative purposes but one or more embodiments may be implemented with a modern multi-core system such as that shown in FIG. 1, or many other kinds of systems. In a preferred but non-limiting approach, blocks 302, 303, 306, 308, and 309 are implemented in software running on a general purpose computer and are embodied in a computer readable storage medium or multiple such media.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
obtaining a plurality of queries of an in-memory column-oriented database, each of said queries having at least one column predicate;

determining, for each of said queries, a plurality of columns in said in-memory column-oriented database to be scanned;

grouping said plurality of queries into a plurality of scan groups, based at least in part on said determining step;

scheduling, for each of the plurality of scan groups, a shared scan of at least one of the plurality of columns according to a scheduling scheme, wherein said scheduling scheme dynamically adjusts a working set size of at least two of the plurality of scan groups by a number of queries therein according real time scan information of an active scan group; and evaluating said column predicates for those of said queries in a given one of said scan groups in accordance with said scheduling scheme, wherein said evaluation includes loading at least one column of said plurality of columns into memory and scanning said at least one column in accordance with said scheduling scheme in connection with at least two queries of said given one of said scan groups;

wherein said grouping step and said scheduling scheme take into account said real time scan information, and wherein said scheduling scheme further dynamically adjusts a scan sharing size of a subsequent evaluation of said column predicates according to said real time scan information.

2. The method of claim 1, wherein said grouping comprises assigning a given one of said queries to an existing one of said scan groups, wherein said existing one of said scan groups is an active group including at least one query being evaluated.

3. The method of claim 1, wherein said determining, for each of said queries, said plurality of columns in said in-memory column-oriented database to be scanned, is based on an estimated query cost and said real time scan information.

4. The method of claim 1, wherein said determining, for each of said queries, said plurality of columns in said in-memory column-oriented database to be scanned, comprises:

for a given one of said queries, ranking those of said plurality of columns in said in-memory column-oriented database to be scanned, based upon a number of records in said in-memory column-oriented database qualified by those of said plurality of columns in said in-memory column-oriented database to be scanned, to obtain at least a first ranked column and a second ranked column; and determining whether said first ranked column should be scanned first or whether said first and second ranked columns should be scanned simultaneously.

5. The method of claim 4, wherein said determining whether said first ranked column should be scanned first or whether said first and second ranked columns should be scanned simultaneously takes into account whether there exists at least one of:

an existing one of said scan groups which scans said first ranked column; and an existing one of said scan groups which scans said first and second ranked columns simultaneously.

6. The method of claim 1, wherein said determining, for each of said queries, said plurality of columns in said in-memory column-oriented database to be scanned, comprises:

for a given one of said queries, ranking those of said plurality of columns in said in-memory column-oriented database to be scanned, based upon a number of records in said in-memory column-oriented database qualified by those of said plurality of columns in said in-memory column-oriented database to be scanned, to obtain at least a first ranked column and a second ranked column; and if said first ranked column has a predicate type that is more costly to operate on first in terms of overall query cost than said second ranked column, not scanning said first ranked column first.

7. The method of claim 2, wherein said assigning said given one of said queries comprises:

determining whether adding said given one of said queries to said existing one of said scan groups would cause a size of said existing one of said scan groups to exceed a size of a cache level at which access latencies can be tolerated; and if said adding said given one of said queries to said existing one of said scan groups would not cause said size of said existing one of said scan groups to exceed said size of said cache level at which said access latencies can be tolerated, assigning said given one of said queries to said existing one of said scan groups.

8. The method of claim 2, wherein said assigning said given one of said queries comprises:

determining whether adding said given one of said queries to said existing one of said scan groups would cause a size of said existing one of said scan groups to exceed a threshold based upon avoidance of stalling; and if said adding said given one of said queries to said existing one of said scan groups would not cause said size of said existing one of said scan groups to exceed said threshold based upon avoidance of stalling, assigning said given one of said queries to said existing one of said scan groups.

9. The method of claim 1, wherein said grouping takes into account quality of service requirements.

10. The method of claim 3, wherein said in-memory column-oriented database is horizontally partitioned into a plurality of partitions, and wherein, in said grouping of said queries, a given one of said plurality of queries is added to an ongoing scan of a corresponding one of said plurality of scan groups at commencement of scanning a new one of said partitions.

11. The method of claim 1, further comprising obtaining said real time scan information as at least one of:

identification of active ones of said scan groups, including said active group;

progress of said active ones of said scan groups; and said working set size of said active ones of said scan groups.

12. The method of claim 11, wherein said in-memory column-oriented database is horizontally partitioned into a plurality of partitions, and wherein said real time scan information is obtained at commencement of scanning a new one of said partitions.

13. The method of claim 1, further comprising providing a system, wherein the system comprises distinct software modules, each of the distinct software modules being embodied on a computer-readable storage medium, and wherein the distinct software modules comprise a query optimization module, a query grouping module, a scheduling module, and a query engine module;

wherein:

said obtaining of said plurality of queries and said determining, for each of said queries, said plurality of columns in said in-memory column-oriented database to be scanned, are carried out by said query optimization module executing on at least one hardware processor;

said grouping said plurality of queries into said plurality of scan groups is carried out by said query grouping module executing on said at least one hardware processor; and said evaluating of said column predicates for those of said queries in said given one of said scan groups in accordance with said scheduling scheme is carried out by said query engine module executing on said at least one hardware processor;

wherein said scheduling scheme is developed by said scheduling module executing on said at least one hardware processor.

14. A computer program product comprising a non-transitory computer readable storage medium having computer readable program code embodied therewith, said computer readable program code comprising:

computer readable program code configured to obtain a plurality of queries of an in-memory column-oriented database, each of said queries having at least one column predicate;

computer readable program code configured to determine, for each of said queries, a plurality of columns in said in-memory column-oriented database to be scanned;

computer readable program code configured to group said plurality of queries into a plurality of scan groups, based at least in part on said determining step;

computer readable program code configured to schedule, for each of the plurality of scan groups, a shared scan of at least one of the plurality of columns according to a scheduling scheme, wherein said scheduling scheme dynamically adjusts a working set size of at least two of the plurality of scan groups by a number of queries therein according real time scan information of an active scan group; and computer readable program code configured to evaluate said column predicates for those of said queries in a given one of said scan groups in accordance with said scheduling scheme, wherein said evaluation includes loading at least one column of said plurality of columns into memory and scanning said at least one column in accordance with said scheduling scheme in connection with at least two queries of said given one of said scan groups;

wherein said grouping and said scheduling scheme take into account said real time scan information, and wherein said scheduling scheme further dynamically adjusts a scan sharing size of a subsequent evaluation of said column predicates according to said real time scan information.

15. The computer program product of claim 14, wherein said computer readable program code configured to group comprises computer readable program code configured to assign a given one of said queries to an existing one of said scan groups, wherein said existing one of said scan groups is an active group including at least one query being evaluated.

16. The computer program product of claim 14, wherein said computer readable program code configured to determine, for each of said queries, said plurality of columns in said in-memory column-oriented database to be scanned, makes said determination based on an estimated query cost and said real time scan information.

17. The computer program product of claim 14, wherein said computer readable program code configured to determine, for each of said queries, said plurality of columns in said in-memory column-oriented database to be scanned, comprises:

computer readable program code configured to, for a given one of said queries, rank those of said plurality of columns in said in-memory column-oriented database to be scanned, based upon a number of records in said in-memory column-oriented database qualified by those of said plurality of columns in said in-memory column-oriented database to be scanned, to obtain at least a first ranked column and a second ranked column; and computer readable program code configured to determine whether said first ranked column should be scanned first or whether said first and second ranked columns should be scanned simultaneously.

18. The computer program product of claim 17, wherein said computer readable program code configured to determine whether said first ranked column should be scanned first or whether said first and second ranked columns should be scanned simultaneously takes into account whether there exists at least one of:

an existing one of said scan groups which scans said first ranked column; and an existing one of said scan groups which scans said first and second ranked columns simultaneously.

19. The computer program product of claim 14, wherein said computer readable program code configured to determine, for each of said queries, said plurality of columns in said in-memory column-oriented database to be scanned, comprises:

computer readable program code configured to, for a given one of said queries, rank those of said plurality of columns in said in-memory column-oriented database to be scanned, based upon a number of records in said in-memory column-oriented database qualified by those of said plurality of columns in said in-memory column-oriented database to be scanned, to obtain at least a first ranked column and a second ranked column; and computer readable program code configured to, if said first ranked column has a predicate type that is more costly to operate on first in terms of overall query cost than said second ranked column, not scan said first ranked column first.

20. An apparatus comprising:

a memory; and at least one processor, coupled to said memory, and operative to:

obtain a plurality of queries of an in-memory column-oriented database, each of said queries having at least one column predicate;

determine, for each of said queries, a plurality of columns in said in-memory column-oriented database to be scanned;

group said plurality of queries into a plurality of scan groups, based at least in part on said determining;

schedule, for each of the plurality of scan groups, a shared scan of at least one of the plurality of columns according to a scheduling scheme, wherein said scheduling scheme dynamically adjusts a working set size of at least two of the plurality of scan groups by a number of queries therein according real time scan information of an active scan group; and evaluate said column predicates for those of said queries in a given one of said scan groups in accordance with said scheduling scheme, wherein said evaluation includes loading at least one column of said plurality of columns into memory and scanning said at least one column in accordance with said scheduling scheme in connection with at least two queries of said given one of said scan groups;

wherein said grouping and said scheduling scheme take into account said real time scan information, and wherein said scheduling scheme further dynamically adjusts a scan sharing size of a subsequent evaluation of said column predicates according to said real time scan information.

21. The apparatus of claim 20, wherein said at least one processor is operative to group by determining whether a given one of said queries should be assigned to an existing one of said scan groups or a new one of said scan groups.

22. The apparatus of claim 21, wherein said at least one processor is operative to determine, for each of said queries, said plurality of columns in said in-memory column-oriented database to be scanned, based on an estimated query cost and said real time scan information.

23. The apparatus of claim 22, wherein said at least one processor is operative to determine, for each of said queries, said plurality of columns in said in-memory column-oriented database to be scanned, by:

for a given one of said queries, ranking those of said plurality of columns in said in-memory column-oriented database to be scanned, based upon a number of records in said in-memory column-oriented database qualified by those of said plurality of columns in said in-memory column-oriented database to be scanned, to obtain at least a first ranked column and a second ranked column; and determining whether said first ranked column should be scanned first or whether said first and second ranked columns should be scanned simultaneously.

24. The apparatus of claim 20, further comprising a plurality of distinct software modules, each of the distinct software modules being embodied on a computer-readable storage medium, and wherein the distinct software modules comprise a query optimization module, a query grouping module, a scheduling module, and a query engine module;

wherein:

said at least one processor is operative to obtain said plurality of queries and determine, for each of said queries, said plurality of columns in said in-memory column-oriented database to be scanned by executing said query optimization module;

said at least one processor is operative to group said plurality of queries into said plurality of scan groups by executing said query grouping module;

said at least one processor is operative to evaluate said column predicates for those of said queries in said given one of said scan groups in accordance with said scheduling scheme by executing said query engine module; and said at least one processor is operative to develop said scheduling scheme by executing said scheduling module.

25. An apparatus comprising:

means for obtaining a plurality of queries of an in-memory column-oriented database, each of said queries having at least one column predicate;

means for determining, for each of said queries, a plurality of columns in said in-memory column-oriented database to be scanned;

means for grouping said plurality of queries into a plurality of scan groups, based at least in part on said determining step;

means for scheduling, for each of the plurality of scan groups, a shared scan of at least one of the plurality of columns according to a scheduling scheme, wherein said scheduling scheme dynamically adjusts a working set size of at least two of the plurality of scan groups by a number of queries therein according real time scan information of an active scan group; and means for evaluating said column predicates for those of said queries in a given one of said scan groups in accordance with said scheduling scheme, wherein said evaluation includes loading at least one column of said plurality of columns into memory and scanning said at least one column in accordance with said scheduling scheme in connection with at least two queries of said given one of said scan groups;

wherein said means for grouping and said scheduling scheme take into account said real time scan information, and wherein said scheduling scheme further dynamically adjusts a scan sharing size of a subsequent evaluation of said column predicates according to said real time scan information.

* * * * *